(12) United States Patent
Hoang

(10) Patent No.: US 7,913,971 B2
(45) Date of Patent: Mar. 29, 2011

(54) HYDRAULIC OVERRIDE

(75) Inventor: Loc G. Hoang, Houston, TX (US)

(73) Assignee: Cameron International Corporation, Houston, TX (US)

( * ) Notice: Subject to any disclaimer, the term of this patent is extended or adjusted under 35 U.S.C. 154(b) by 908 days.

(21) Appl. No.: 10/908,166

(22) Filed: Apr. 29, 2005

(65) Prior Publication Data

US 2006/0243937 A1 Nov. 2, 2006

(51) Int. Cl.
*F16K 31/00* (2006.01)

(52) U.S. Cl. ............ 251/14; 251/63; 251/63.6; 251/326

(58) Field of Classification Search .................. 251/326, 251/14, 62, 63, 63.5, 63.6, 129.04, 129.03
See application file for complete search history.

(56) References Cited

U.S. PATENT DOCUMENTS

| | | | | |
|---|---|---|---|---|
| 2,757,516 A * | 8/1956 | Buttolph | ......................... | 62/50.4 |
| 2,890,014 A * | 6/1959 | Luoma et al. | ................... | 251/14 |
| 3,734,455 A * | 5/1973 | Natho et al. | ..................... | 251/62 |
| 3,861,221 A * | 1/1975 | Stanley | ............................. | 74/25 |
| 4,295,390 A * | 10/1981 | Buchta | ............................. | 74/625 |
| 4,568,058 A * | 2/1986 | Shelton | .......................... | 251/62 |
| 4,650,151 A * | 3/1987 | McIntyre | ......................... | 251/14 |
| 5,497,672 A | 3/1996 | Appleford et al. | | |
| 6,089,531 A * | 7/2000 | Young | ............................ | 251/61.4 |
| 6,487,960 B1 * | 12/2002 | Chatufale | ................... | 92/165 R |
| 6,595,487 B2 | 7/2003 | Johansen et al. | | |
| 6,609,533 B2 * | 8/2003 | Sundararajan | ............. | 137/15.19 |
| 6,684,897 B2 * | 2/2004 | Sundararajan | ............. | 137/15.19 |
| 6,719,057 B2 | 4/2004 | Johansen | | |
| 2002/0011580 A1 | 1/2002 | Johansen et al. | | |
| 2002/0084075 A1 | 7/2002 | Johansen | | |
| 2003/0116733 A1 * | 6/2003 | Hoang et al. | .................... | 251/62 |
| 2003/0145667 A1 | 8/2003 | Donald et al. | | |
| 2005/0020402 A1 * | 1/2005 | Ny et al. | .......................... | 476/10 |

\* cited by examiner

*Primary Examiner* — John K Fristoe, Jr.
*Assistant Examiner* — Andrew J Rost
(74) *Attorney, Agent, or Firm* — Conley Rose, P.C.

(57) ABSTRACT

A valve system comprising a closure member that is linearly translatable within a valve body. A hydraulic override assembly comprises a first end that is connected to the valve body and a first rod member that is connected to the closure member. A linear actuator is connected to a second end of the hydraulic override assembly and comprises a second rod member that is operable to move the first rod member.

21 Claims, 3 Drawing Sheets

HYDRAULIC OVERRIDE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

The present invention relates generally to valve actuators. More specifically, the present invention relates to override and backup systems for subsea valve actuators. Still more specifically, the present invention relates to hydraulic override systems for subsea valve applications.

Increasing performance demands for subsea hydrocarbon production systems have led to a demand for high performance control systems to operate subsea pressure control equipment, such as valves and chokes. Hydraulic actuators are used to operate many of the pressure control equipment used subsea. Pressurized hydraulic fluid may be supplied to the hydraulic actuators by a direct hydraulic control system or an electrohydraulic control system. Direct hydraulic control systems provides pressurized hydraulic fluid directly from the surface to the subsea valve actuators. Electrohydraulic control systems utilize electrical signals transmitted to an electrically actuated valve manifold that controls the flow of hydraulic fluid to the hydraulic actuators of the pressure control equipment.

The performance of both direct hydraulic and electrohydraulic control systems is affected by a number of factors, including the water depth in which the components operate, the distance from the platform controlling the operation, and a variety of other constraints. Thus, as water depth and field size increases, the limits of hydraulic control systems become an increasing issue. Further, even when the use of a hydraulic control system is technically feasible, the cost of the system may preclude its use in a smaller or marginal field.

In order to provide an alternative to hydraulic control systems, full electrical control systems, including electric actuators, have been developed. Instead of relying on pressurized hydraulic fluid to actuate the pressure control components, electrical actuators are supplied with an electric current. The reliance on electric current can allow for improved response times, especially over long distances and in deep water.

Even with electrical control systems and actuators, many operators still desire some sort of system that allows for operation of the actuators in the case of failure of the electric actuator or interruption in the supply of electrical current. In certain applications, an operator may want to be able to override the electrical control system and operate a valve, or some other components, via remote operation or direct intervention, such as with a remotely operated vehicle (ROV).

Thus, there remains a need to develop methods and apparatus for allowing operation of subsea actuators that overcome some of the foregoing difficulties while providing more advantageous overall results.

SUMMARY OF THE PREFERRED EMBODIMENTS

The embodiments of the present invention are directed toward methods and apparatus for a valve system comprising a closure member that is linearly translatable within a valve body. A hydraulic override assembly comprises a first end that is connected to the valve body and a first rod member that is connected to the closure member. A linear actuator is connected to a second end of the hydraulic override assembly and comprises a second rod member that is operable to move the first rod member.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1:
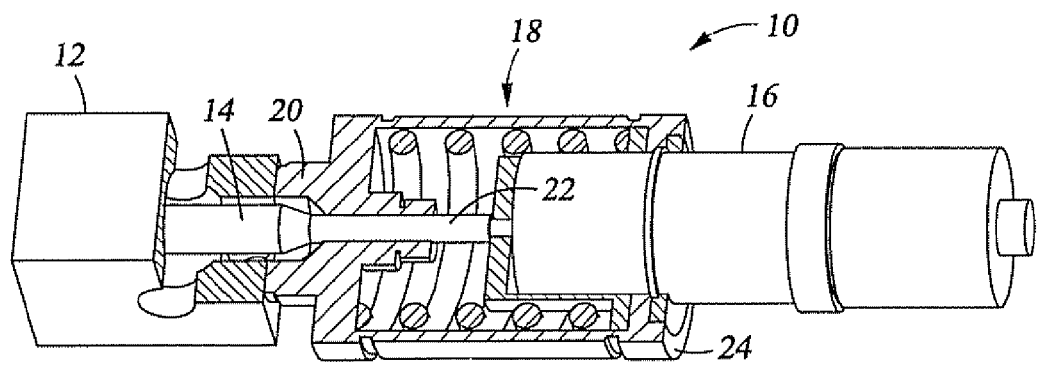
FIG. 1 is a partial sectional view of a valve actuator with an override system constructed in accordance with embodiments of the invention.

Referring now to FIG. 1, valve system 10 comprises valve body 12, closure member 14, linear actuator 16, and hydraulic override assembly 18. First end 20 of hydraulic override assembly 18 is connected to valve body 12. Rod 22 of hydraulic override assembly 18 is coupled to closure member 14. Linear actuator 16 is connected to second end 24 of hydraulic override assembly 18.

Figure 2:
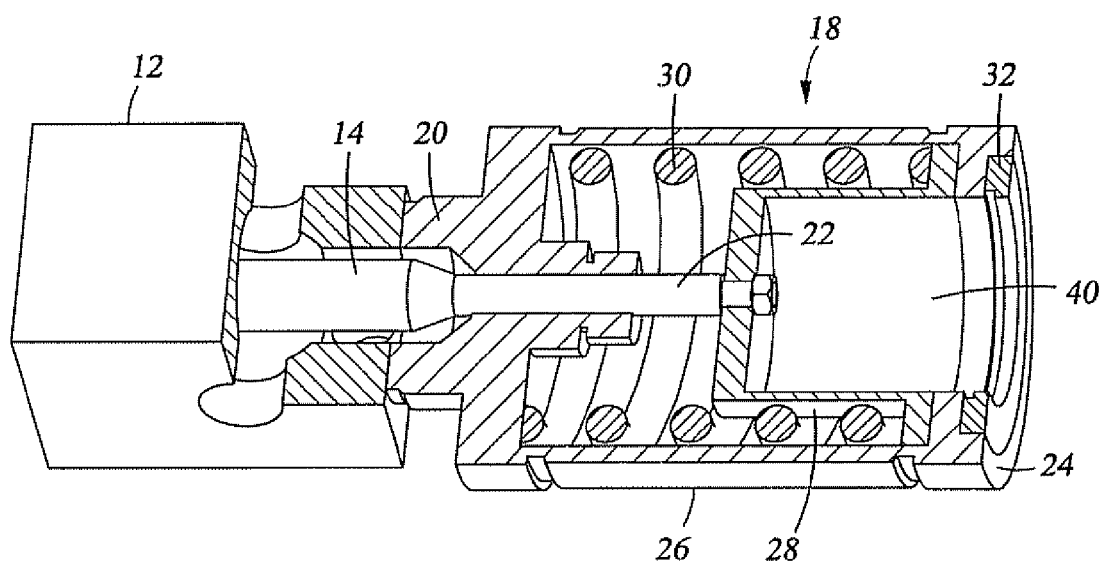
FIG. 2 is a partial sectional view of an override system constructed in accordance with embodiments of the invention.

Referring now to FIG. 2, hydraulic override assembly 18 comprises body 26, piston 28, spring 30, and retainer 32. Piston 28 forms receptacle 40 and is connected to rod 22. Piston 28 sealingly engages the inner surface of body 26. Spring 30 is disposed between first end 20 and piston 28 so as to bias piston 28 toward second end 24.

Figure 3:
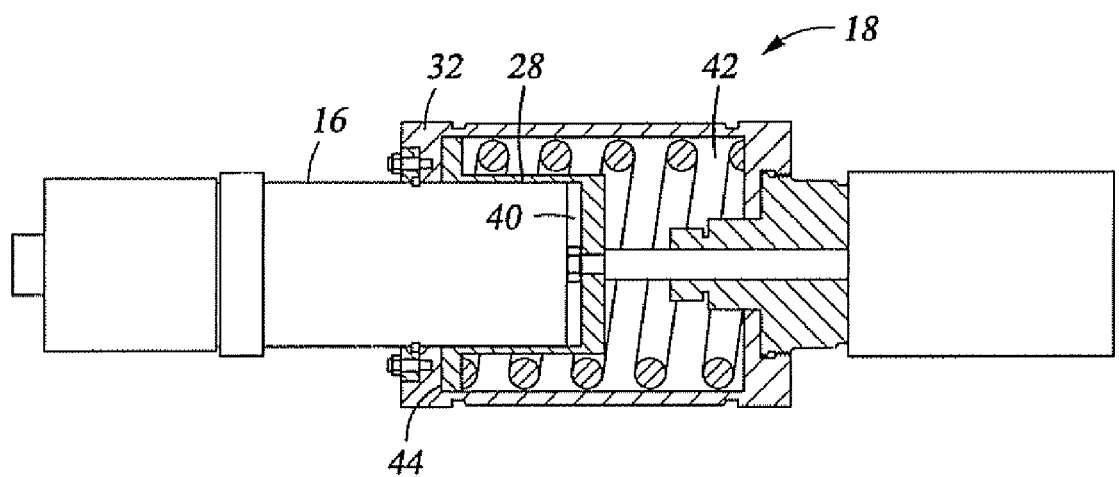
FIG. 3 is a partial sectional view of a valve actuator with an override system constructed in accordance with embodiments of the invention.
Figure 4:
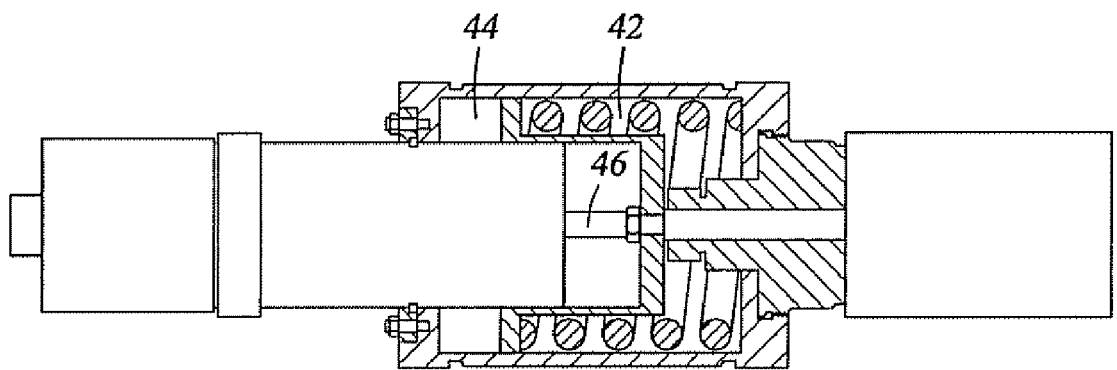
FIG. 4 is a partial sectional view of a valve actuator with an override system constructed in accordance with embodiments of the invention.

Referring now to FIGS. 3 and 4, receptacle 40 receives a portion of linear actuator 16 that is connected to hydraulic override assembly 18 by retainer 32. Assembly 18 is sealingly engages with body 26 such that piston 28 forms a first hydraulic chamber 42 on the first end 20 side of the piston and a second hydraulic chamber 44 on the second end 24 side of the piston. FIG. 3 shows valve assembly 10 in a retracted position where piston 28 is positioned toward second end 24 and spring 30 is expanded. FIG. 4 shows valve assembly 10 in an extended position where piston 28 is positioned toward first end 20 and spring 30 is collapsed.

Override assembly 18 may generally operate in a pressure-balanced first mode where the hydraulic pressure in hydraulic chambers 42 and 44 is equal. In this mode, piston 28 is moved toward first end 20 by the operation of actuator 16. Actuator 16 extends rod 46 (see FIG. 4) that bears against rod 22 that is connected to of piston 28. The movement of piston 28 toward first end 20 compresses spring 30. As actuator 16 retracts rod 46, spring 30 pushes piston 28 toward second end 24. During activation of actuator 16, hydraulic fluid is allowed to flow between hydraulic chambers 42 and 44 so as to equalize the pressure across piston 28.

In certain embodiments, piston 28 may comprise one or more fluid passageways through the piston that allow the hydraulic fluid to flow between chambers 42 and 44. The fluid passageways may be sized so as to restrict the flow of fluid and limit the speed at which piston 28 may travel. When configured with the fluid passageways, override assembly 18 can only act as a fail-safe device where spring 30 pushes piston 28 toward second end 24 unless linear actuator 16 is operating. In certain embodiments, rod 46 may be coupled to piston 28 such that piston acts to control the speed at which rod 46 can be retracted. Coupling rod 46 to piston 28 allows for a position sensor in linear actuator 16 to always indicate the actual position of closure member 14.

Figure 5:
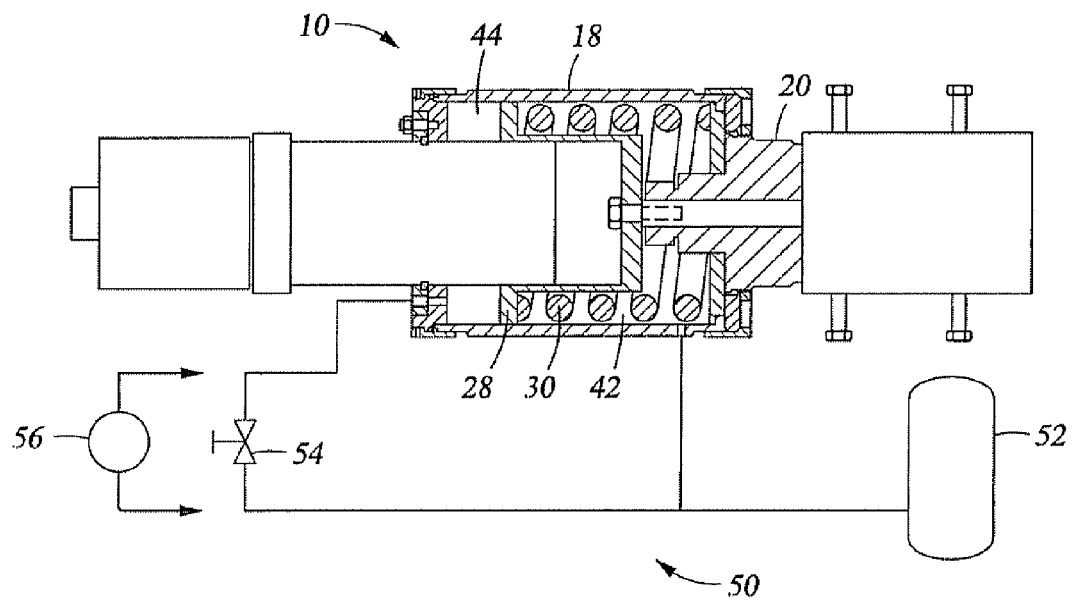
FIG. 5 is a schematic view of a hydraulic system used with an override system constructed in accordance with embodiments of the invention.
Figure 6:
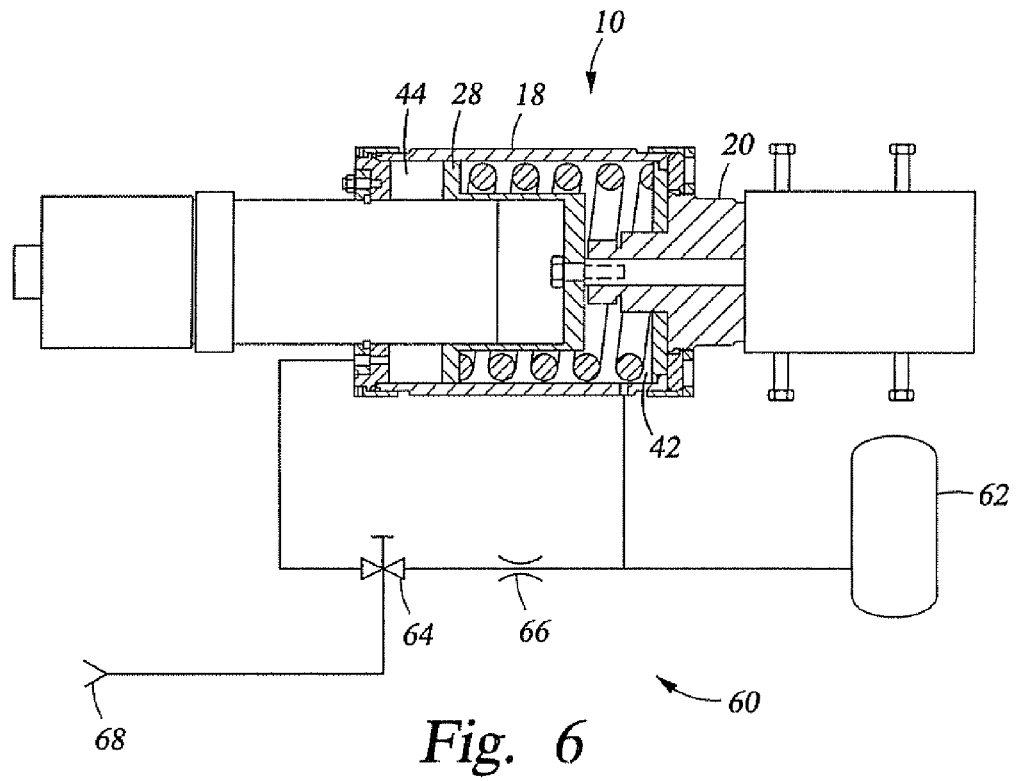
FIG. 6 is a schematic view of a hydraulic system used with an override system constructed in accordance with embodiments of the invention.

In certain applications, it may be desirable to provide override assembly 18 with the functionality to operate when actuator 16 malfunctions or otherwise can not operate. For example, in the event that actuator 16 malfunctions or fails to operate, override assembly 18 can be operated in an active second mode and used to shift the valve assembly. FIGS. 5-6 depict hydraulic configurations that allow override assembly 18 to be operated independently of linear actuator 16.

Referring now to FIG. 5, valve system 10 is coupled with hydraulic system 50 comprising accumulator 52, valve 54, and pump 56. Valve 54 and pump 56 are connected to system 50 by couplings 58 that allow the valve and the pump to be interchanged. Accumulator 52 provides pressure compensation for subsea operation and allows for displacement of When valve 54 is connected to system 50 and in an open position, hydraulic fluid can flow freely between hydraulic chambers 42 and 44. When direct operation of override assembly 18 is desired, pump 56 can be connected, such as by an ROV, and the pump operated to move pressurized fluid into hydraulic chamber 44 so as to compress spring 30 and move piston 28 toward first end 20. Pump 56 can be deactivated or reversed and spring 30 will expand, forcing fluid out of chamber 44 and moving piston in the opposite direction.

Referring now to FIG. 6, system 10 is coupled with hydraulic system 60 comprising accumulator 62, valve 64, flowline restriction 66, and coupling 68. Flowline restriction 66 restricts the flow of fluid so as to limit the speed at which piston 28 can travel. Valve 64, when closed, provides a hydraulic lock on piston 28 and, when open, allows fluid to move between hydraulic chambers 42 and 44. Coupling 68 allows for ROV intervention for control of valve 64 and operation of override apparatus 18.

It is understood that a variety of different hydraulic systems and arrangements can be used to operate a hydraulic override system. In certain embodiments, the hydraulic system may be actuated from a remote location, such as a surface control panel. In other embodiments, the hydraulic system is actuated directly by an ROV or some other submersible.

While preferred embodiments of this invention have been shown and described, modifications thereof can be made by one skilled in the art without departing from the scope or teaching of this invention. The embodiments described herein are exemplary only and are not limiting. Many variations and modifications of the system and apparatus are possible and are within the scope of the invention. For example, the relative dimensions of various parts, the materials from which the various parts are made, and other parameters can be varied, so long as the override apparatus retain the advantages discussed herein. Accordingly, the scope of protection is not limited to the embodiments described herein, but is only limited by the claims that follow, the scope of which shall include all equivalents of the subject matter of the claims.

What is claimed is:

1. A subsea valve system locatable and operable subsea comprising:
   a closure member that is linearly translatable within a valve body;
   a hydraulic override assembly comprising a first end that is connected to the valve body and a first rod member that is connected to the closure member;
   a linear actuator connected to a second end of the hydraulic override assembly and operable subsea;
   wherein the linear actuator comprises a second rod member that is moveably disposed within a housing;
   wherein the second rod member is extendable subs a to linearly translate the first rod member and the closure member and hold the closure member in an open position;
   wherein the hydraulic override assembly is operable subsea to linearly translate the closure member independent of the operation of the linear actuator and hold the closure member in a closed position; and
   wherein a portion of the housing of the linear actuator partially defines a hydraulic chamber of the hydraulic override assembly.

2. A subsea valve system locatable and operable subsea comprising:
   a closure member that is linearly translatable within a valve body;
   a hydraulic override assembly comprising:
      a first end that is connected to the valve body;
      a first rod member that is connected to the closure member; and
      a body coupled to the valve body; and
      a piston connected to the first rod member and sealingly engaged with the inside of the body;
   a linear actuator connected to a second end of the hydraulic override assembly and operable subsea, wherein the linear actuator comprises a second rod member that is moveably disposed within a housing;
   wherein the second rod member is extendable to linearly translate the first rod member and the closure member to hold the closure member in an open position;
   wherein the hydraulic override assembly is operable subsea to linearly translate the closure member independent of the operation of the linear actuator and without translating the second rod member to hold the closure member in a closed position; and
   wherein a portion of the housing of the linear actuator is disposed within the piston.

3. The subsea valve system of claim 2 wherein the linear actuator is an electric actuator operable subsea.

4. The subsea valve system of claim 2 wherein the hydraulic override assembly further comprises a spring disposed within a body, wherein the spring biases the piston toward the second end of the hydraulic override assembly.

5. The subsea valve system of claim 2 wherein the hydraulic override assembly further comprises a first hydraulic chamber formed between the piston and the first end of the assembly and a second hydraulic chamber formed between the piston and the second end of the assembly.

6. The subsea valve system of claim 5 wherein the hydraulic override assembly operates in a first mode wherein hydraulic fluid is allowed to flow between the first and second hydraulic chambers.

7. The subsea valve system of claim 6 wherein the hydraulic fluid flowing between the first and second hydraulic chambers passes through a flow restriction.

8. The subsea valve system of claim 7 wherein the pressurized fluid is supplied by a pump.

9. The subsea valve system of claim 6 wherein the hydraulic override assembly operates in a second mode wherein pressurized fluid is supplied to the second hydraulic chamber so as to linearly translate the closure member within the valve body.

10. A subsea hydraulic override system locatable and operable subsea with a valve body comprising a closure member and a linear actuator comprising an actuator rod, the subsea hydraulic override system comprising:
   a body comprising a first end coupled to the valve body and a second end coupled to the linear actuator;
   a piston disposed within the body;
   a first hydraulic chamber formed between the piston and the first end of the body;
   a first rod connected to the piston, extending through the first end of the body, and connected to the closure member;
   a spring disposed within the first hydraulic chamber and operable to bias the piston toward a second end of the body;
   wherein the piston and the first rod are moveable toward the first end of the body independently of the linear actuator to hold the closure member in an open position;
   wherein the piston and the first rod are moveable toward the second end of the body independently of the linear actuator to hold the closure member in a closed position;
   wherein a portion of the housing of the linear actuator is disposed within the piston and sealingly engages the body.

11. The subsea hydraulic override of claim 10 wherein the linear actuator is operable subsea to actively linearly translate the closure member within the valve body to hold the closure member in an open position.

12. The subsea hydraulic override of claim 10 wherein the linear actuator is an electric actuator.

13. The subsea hydraulic override of claim 10 wherein the hydraulic override assembly further comprises a second hydraulic chamber formed between the piston and the second end of the assembly.

14. The subsea hydraulic override of claim 13 wherein the hydraulic override operates in a first mode wherein hydraulic fluid is allowed to flow between the first and second hydraulic chambers.

15. The subsea hydraulic override of claim 14 wherein the hydraulic fluid flowing between the first and second hydraulic chambers passes through a flow restriction.

16. The subsea hydraulic override of claim 15 wherein the pressurized fluid is supplied by a pump.

17. The subsea hydraulic override of claim 14 wherein the hydraulic override operates in a second mode wherein pressurized fluid is supplied to the second hydraulic chamber so as to move the closure member within the valve body.

18. A subsea valve system locatable and operable subsea comprising:
   a closure member linearly translatable within a valve body;
   a linear actuator comprising an actuator rod selectively extendable from a housing, wherein extension of the actuator rod translates the closure member within the valve body and holds the closure member in an open position;
   a means, operable subsea, for utilizing hydraulic pressure to translate the closure member independently of operation of the linear actuator or extension of the actuator rod and hold the closure member in at least the open position and a closed position; and
   wherein a portion of the housing of the linear actuator is disposed within the means for utilizing hydraulic pressure.

19. The subsea valve system of claim 18 wherein the means for utilizing hydraulic pressure is disposed between the linear actuator and the valve body.

20. The subsea valve system of claim 18 wherein the means for utilizing hydraulic pressure comprises a supply of pressurized hydraulic fluid supplied by a pump.

21. The subsea valve system of claim 18 wherein the linear actuator is an electric actuator.

* * * * *